(12) United States Patent
Wheeler

(10) Patent No.: US 7,856,549 B2
(45) Date of Patent: Dec. 21, 2010

(54) REGULATING POWER CONSUMPTION

(75) Inventor: Andrew R. Wheeler, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 806 days.

(21) Appl. No.: 11/657,144

(22) Filed: Jan. 24, 2007

(65) Prior Publication Data

US 2008/0177424 A1 Jul. 24, 2008

(51) Int. Cl.
*G06F 15/16* (2006.01)
(52) U.S. Cl. .................... 713/1; 713/2; 718/1; 709/223
(58) Field of Classification Search .................. 713/1, 713/2; 709/223; 718/1
See application file for complete search history.

(56) References Cited

U.S. PATENT DOCUMENTS

| 6,125,456 | A | 9/2000 | Takahashi | |
|---|---|---|---|---|
| 2005/0251802 | A1* | 11/2005 | Bozek et al. | 718/1 |
| 2006/0005189 | A1* | 1/2006 | Vega et al. | 718/1 |
| 2007/0180436 | A1* | 8/2007 | Travostino et al. | 717/138 |
| 2008/0163239 | A1* | 7/2008 | Sugumar et al. | 718/105 |

OTHER PUBLICATIONS

VMWARE, VMware Virtual Center User's Manual,: v 1.0, Mar. 19, 2004, www.vmware.com/pdf/virtualcenter_users_manual.pdf.*
China Office Action, dated May 11, 2010, English translation, 9 Pages.

* cited by examiner

*Primary Examiner*—Abdelmoniem Elamin

(57) ABSTRACT

A system for dynamically regulating power consumption in an information technology (IT) infrastructure having a plurality of compute nodes interconnected over a network is provided. The system includes at least one virtual machine (VM) host deployed at each of the plurality of compute nodes, the at least one VM host is operable to host at least one VM guest, and the VM hosts on different ones of the plurality of compute nodes are version compatible to enable migration of the VM guests among the VM hosts. The system further includes a management module connected to the plurality of compute nodes over the network to receive a native measurement of a performance metric of a computing resource in each of the plurality of compute nodes, the management module is operable to dynamically regulate power consumption of the plurality of compute nodes by migrating the VM guests among the VM hosts based at least on the received performance metrics of the plurality of compute nodes.

19 Claims, 4 Drawing Sheets

REGULATING POWER CONSUMPTION

BACKGROUND

The power and cooling cost for large information technology (IT) infrastructures, such as data centers, can easily exceed millions of dollars per year. Yet, computing resources such as central processing units (CPUs), memory, network switches, etc. within each data center are being used at much less than maximum capacity. Consequently, a large percentage of the power and cooling costs are being consumed by "idle" computing resources, thereby wasting energy and driving up costs for IT infrastructures. As referred herein, and as understood in the art, information technology, or IT, encompasses all forms of technology, including but not limited to the design, development, installation, and implementation of hardware and software information systems and software applications, used to create, store, exchange and utilize information in its various forms including but not limited to business data, conversations, still images, motion pictures and multimedia presentations technology and with the design, development, installation, and implementation of information systems and applications.

Several cost and energy saving solutions for IT infrastructures such as data centers exist today. One solution is to employ Energy Star or Advanced Configuration and Power Interface (ACPI) compliant devices in a data center. These devices are capable of operating indifferent power modes, such as low or standby power modes, whey they are idling or not actively used. However, as silicon fabrication geometries continue to decrease to provide ever smaller electronic devices and spacings there between, even those devices that are in standby power mode continue to draw or consume power through current leakage from nearby powered devices. Consequently, each device must be completely shut down or powered off (e.g., pull the plug) in order to realize maximum power savings.

Another solution involves the use of CPU or memory power throttling techniques to throttle the issue rate of transactions, operations, or throughputs as power or thermal limit thresholds are exceeded. However, such power throttling techniques offer modest power savings because, as noted above, current leakage losses remain. Still another cost saving solution that is supported by many data center vendors is instant capacity on demand. In this solution, customers or users of computing resources are provided with options to dynamically purchase the right to use spare computing resources based on their current demands. While this solution allows a data center customer with cost effective means to increase computing capacity as the workload demand increases, there is really no concept of energy saving because in most cases the spare computing resources reside in data centers and consume power while they wait to be called upon.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for dynamically regulating power consumption in an IT infrastructure, such as a data center, using software utilization agents and virtual machine (VM) hosts to achieve cost and energy savings. As referred herein, a VM host is an abstract or virtualized computing layer or platform that is created within a physical or hardware computing platform. The virtualized computing environment employs one or more computing resources from the underlying physical computing platform and its own operating system (OS), which may be the same or different from that of the physical computing platform, to execute or run software applications. A VM host is also known as a hypervisor or a VM monitor. According to various embodiments described herein, the emerging technology of machine virtualization is exploited to address the problem of underutilized resources and wasted power delivered thereto. By combining this technology with the novel hardware and software as described herein, virtualization concepts are applicable to provide energy and cost savings within an IT infrastructure.

Figure 1:
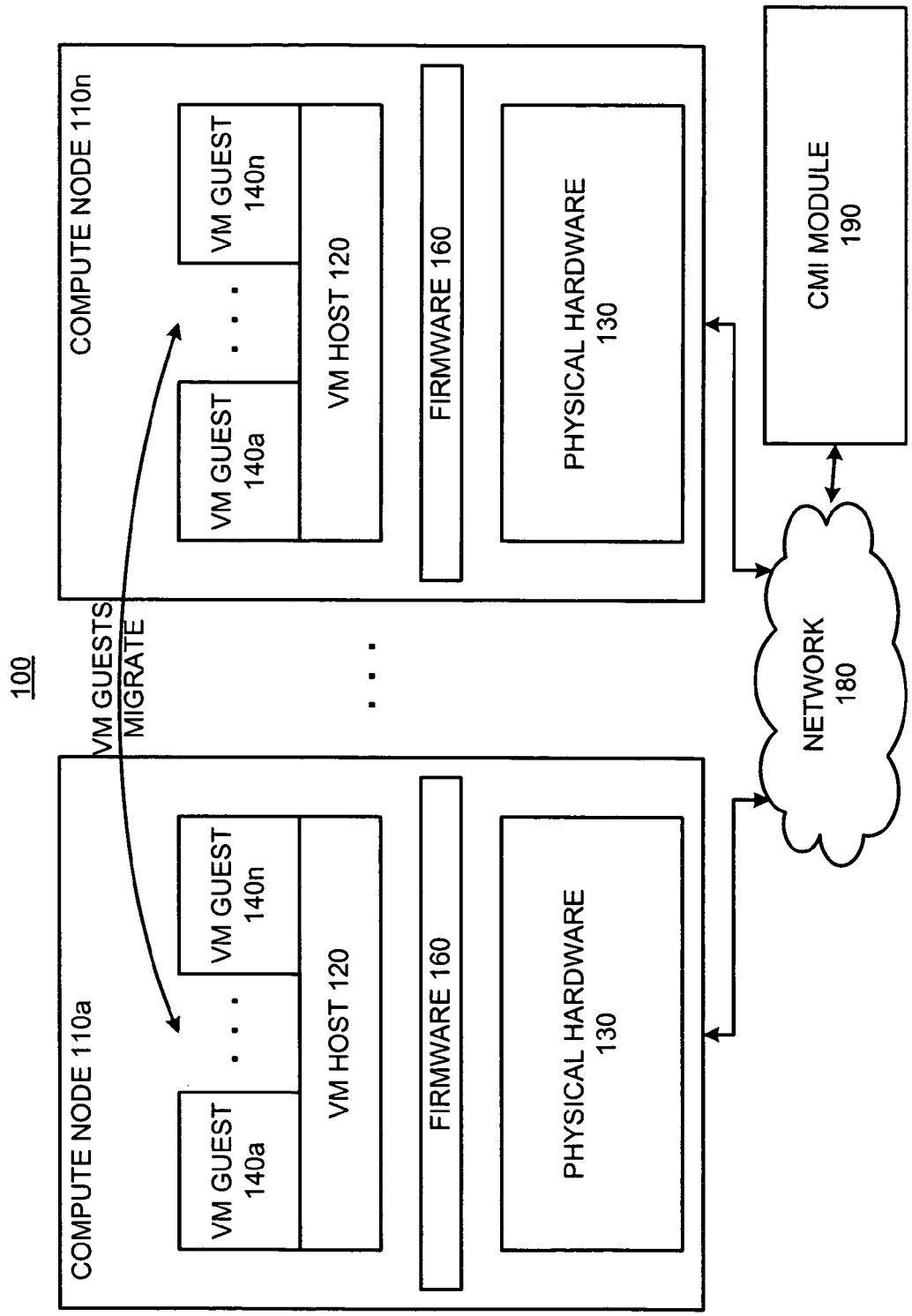
FIG. 1 illustrates an IT system wherein one or more embodiments maybe practiced.

FIG. 1 illustrates an exemplary block diagram of an IT infrastructure or system 100, such as a data center or an IT network enterprise, wherein one or more embodiments may be practiced. It should be readily apparent to one of ordinary skill in the art that the system 100 represents a generalized schematic illustration and that other components may be added or existing components may be removed or modified without departing from the spirit or scope of the present invention.

The system 100 comprises a plurality of compute nodes 110a-n interconnected and operable to exchange information among themselves and with other network nodes over a network 180. As referred herein, the compute nodes 110a-n may be physical computing platforms with associated physical hardware 130, such as personal digital assistants (PDAs), laptop or desktop personal computers (PCs), workstations, servers, and other similar computing or computerized devices. Alternatively, the compute nodes 110a-n may be server blades in a blade server system. Any two or more compute nodes 110a-n may have identical or different hardware configurations for their physical computing platforms. Each compute node is operable to be powered down, by a complete power shut down (i.e., power off) or placed in a power standby mode, independent of other compute nodes. The network 180 is operable to provide a communication channel among the compute nodes 110a-n. The network 180 may be implemented as a local area network (LAN), a wide area network (WAN), a public data network (e.g., Internet), a private data network (e.g., Intranet), or any combination thereof. The network 180 may implement wired protocols, such as Ethernet, token ring, etc., wireless protocols, such as cellular digital packet data, Mobitex, IEEE 801.11 family, Bluetooth, Wireless Application Protocol, Global System for Mobiles, etc., or any combination thereof.

Deployed at each of the compute nodes 110a-n is a virtualization layer capable of hosting a multiple-VM-guest environment. The virtualization layer is implemented by one or more VM hosts 120, each serving as an abstraction layer between the physical hardware 130 of each compute node and one or more VM guests 140a-n hosted by such a compute node. The VM hosts 120 may be implemented with proprietary or commercially-available software to operate above the firmware layer 160. A user such as a system administrator may be responsible for determining how many VM guests to instantiate. In one embodiment, VM hosts 120 running on separate compute nodes are version compatible so as to be operable to migrate VM guests to and from one another. From the perspective of a VM guest, it does not distinguish the virtualized hardware of a VM host from the dedicated physical hardware 130 of the underlying compute node for such a VM host. As referred herein, a VM guest is an instance of an operating environment, typically an OS, and its applications therein. Thus, a workload demand of a VM guest refers to the amount of computing resources required by the VM guest to effectively run an operating environment and its applications therein at a desired level of performance. Likewise, a workload capacity of a computing resource refers to the maximum amount of workload a computing resource can effectively handle without failure.

Figure 2:
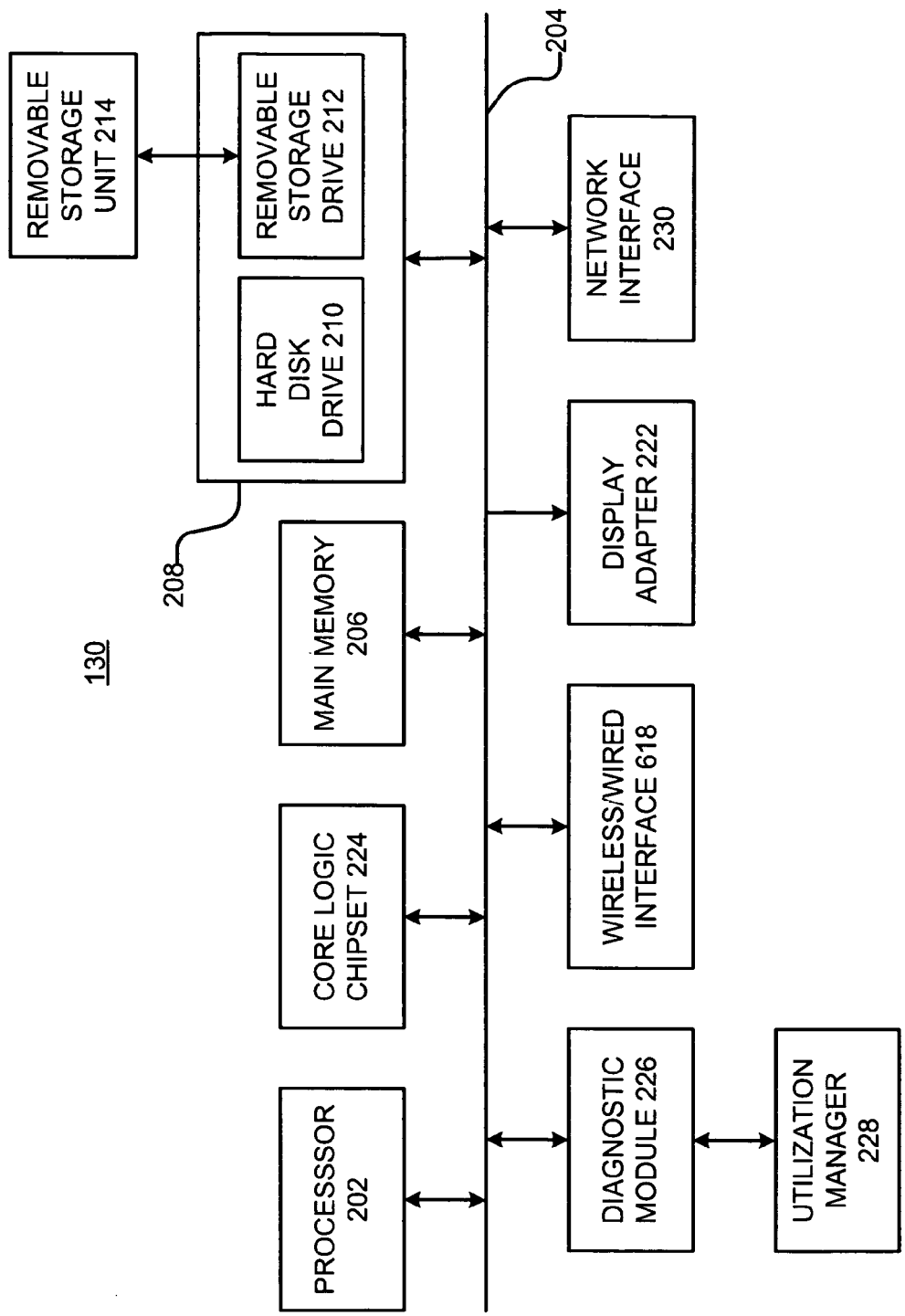
FIG. 2 illustrates the physical hardware in a compute node of an IT system, in accordance with one embodiment.

The physical hardware 130 includes one or more computing resources such as processors, memory devices, and input/output (I/O) devices as further detailed below. These computing resources are controlled by programming instructions from the firmware 160, which resides in each of the computing resources. FIG. 2 illustrates a block diagram of the physical hardware 130 in each of the compute node 110a-n. It should be understood that a more sophisticated physical hardware may be used. Furthermore, components may be added or removed from the physical hardware 130 to provide the desired functionality.

The physical hardware 130 includes one or more processors, such as a processor 202, providing an execution platform for executing software. Thus, the physical hardware 130 may include one or more single-core or multi-core processors of any of a number of computer processors, such as processors from Intel and AMD. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a system communication bus 204. The physical hardware 130 also includes a core logic chipset 224 which handles its central functions, including traffic functions such as a cache for instructions, a controller for handling memory, bus interface logic, and data path functions over the communication bus 204. In general, the core logic chipset 224 handles any central or critical functions of the physical hardware 130 that are not hosted by the processor 202.

The physical hardware 130 also includes a main memory 206 where software is resident during runtime, and a secondary memory 208. The secondary memory 208 may be used to store software programs, applications, or modules that implement one or more VM hosts 140a-n, or parts thereof. The main memory 206 and secondary memory 208 (and an optional removable storage unit 214) each includes a computer readable medium (CRM), such as a hard disk drive and/or a removable storage drive 212 representing a floppy diskette drive, a magnetic tape drive, a compact disk drive, etc., or a nonvolatile memory where a copy of the software is stored. In one example, the main memory 206 or the secondary memory 208 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The physical hardware 130 optionally includes a display adapter 222 for providing images to a display (not shown) connected to each compute node, wireless or wired user interfaces 218 for input devices, such as a keyboard, a mouse, a stylus, and the like. A network interface 230 is provided for communicating with other compute nodes via, for example, the network 180.

In one embodiment, the physical hardware 130 further includes a self diagnostic unit or module 226, which is used to measure in real time performance metrics of the computing resources in the physical hardware 130. The self diagnostic unit 226 is operable to tap into the performance counters that are native, or built-in, to the computing resources, via the communication bus 204, to measure the performance metrics. Instead of using the communication bus 204, alternatively embodiments are contemplated wherein the self-diagnostic unit 226 may use a point-to-point link or sideband (also known as out-of-band) interface with each of the computing resources, and supported by such computing resources, in order to tap into the native performance counters in the computing resources. Examples of such an interface include but are not limited to a system management bus (SMBus) interface, a joint test action group (JTAG) bus, or other similar low-pin-count interfaces. Examples of performance metrics include but are not limited to resource utilizations such as CPU utilization (e.g., CPU time utilized for a particular application or operation), memory utilization (e.g., memory storage utilized for a particular application or operation), and I/O utilization (e.g., I/O bandwidth utilized for a particular application or operations). Other examples of performance metrics include but are not limited to I/O and memory throughputs (e.g., how much data received or delivered per time unit, how much data is read from or written to a memory storage per time unit), operational latency (e.g., how much time delay caused by computing operations on an input to provide an output), power drawn (power consumed by the computing resources or a particular application or operation).

A utilization agent 228 is provided to track or monitor in real time the performance metrics gathered by the self-diagnostic unit 226. The utilization agent 228 also implements power sequencing controls to provide power to the physical hardware 130 and components therein. The utilization agent 228 may be implemented by a hardware controller that includes, for example, a programmable controller, or software resident in a memory of the physical hardware 130, or a combination of hardware and software, to gather the performance metrics as measured by one or more diagnostic units 226 and to switch the components in the physical hardware 130 to different power modes. In one embodiment, the utilization agent 228 has a communication channel or otherwise interfaces with the self-diagnostic unit 226 to facilitate the tracking or monitoring of the performance metrics. It also interfaces with a one or more power supplies (not shown) in the physical hardware 130 in order to implement the aforementioned power sequencing controls. In another embodiment, the diagnostic unit 226 and the utilization agent 228 are incorporated into a single unit or module with the aforementioned interface with the one or more power supplies in the physical hardware 130. In still another embodiment, each computing resource (e.g., processor 202, main memory 206, secondary memory 208, core logic chipset 224) includes a self-diagnostic unit therein, and the utilization agent 228 has communication channels with these computing resources for tracking or monitoring the performance metrics of such resources.

As described above, the various components of the physical hardware 130 may be implemented separately from one another. Alternatively, all of the components in the physical hardware 130 are implemented in a system on chip (SoC) architecture, wherein they are implemented as single semiconductor package instance. Additional alternative embodiments are contemplated wherein one or more components may be integrated together and yet separate from other components. For example, a CPU may include an integrated memory, such as the main memory 206, or an integrated display adapter 222 (or any other video controller). Other embodiments are contemplated wherein the processor 202 is a links-based processor that does not employ the system communication bus 204 for data transfers with other components in the physical hardware 130. Instead, processor 202 may have point-to-point links with each of the other components.

Referring back to FIG. 1, the utilization agent 228 in each of the compute nodes 110a-n monitors the measured performance metrics of the computing resources therein and provides or sends this information via the network 180 to a central management intelligence (CMI) module 190, which then uses such information to dynamically manage the compute nodes 110a-n to provide dynamic regulation of power consumption at these nodes. In one embodiment, the utilization agent 228 and the CMI module 190 are incorporated into a single unit or module. Based on predetermined rules or criteria programmed into the CMI module 190, e.g., based on a decrease in resource utilization at a VM host 120 deployed at a compute node 110a, the CMI module 190 may command one or more VM guests 140a-n in a VM host 120 deployed at one compute node to be offloaded or migrated to a VM host 120 deployed at another compute node. Once a given VM host no longer has VM guests, its underlying compute node may be powered down (placed in power off mode or standby power mode) by the CMI module 190 to reduce power consumption. As noted earlier, this is made possible by the ability of each compute node to switch to different power modes independent from other computer nodes in the system 100. Also, no leakage current is encountered when the selected VM hosts are located at computing nodes in different locations. As workload demands by existing or additional VM guests increase, a powered-down compute node may be powered up again or brought back online as needed to provide additional computing resources to accommodate the additional VM guests or transfer those existing VM guests from over-subscribed VM hosts.

In one embodiment, the CMI module 190 is hosted on a computing platform separate from the managed environment of the compute nodes 110a-n so as not to interfere with or affect the performance metrics measured from such a managed environment. Furthermore, the use of a self-diagnostic unit 226 at the hardware level in each of the compute nodes 110a-n ensures that accurate performance metrics are measured from performance counters that are native to the computing resources of each compute node. This is in contrast to the conventional reliance on typical diagnostic software that operates on top of the firmware layer 160 (e.g., such as user or privileged level application programs) to calculate instead of measure the performance metrics based on some given benchmark tests that may or may not be applicable to those operations desired by the VM guests hosted by the compute node. Such diagnostic software further utilizes computing resources in conventional systems and skews the same performance metrics that it is actually designed to measure.

Figure 3A:
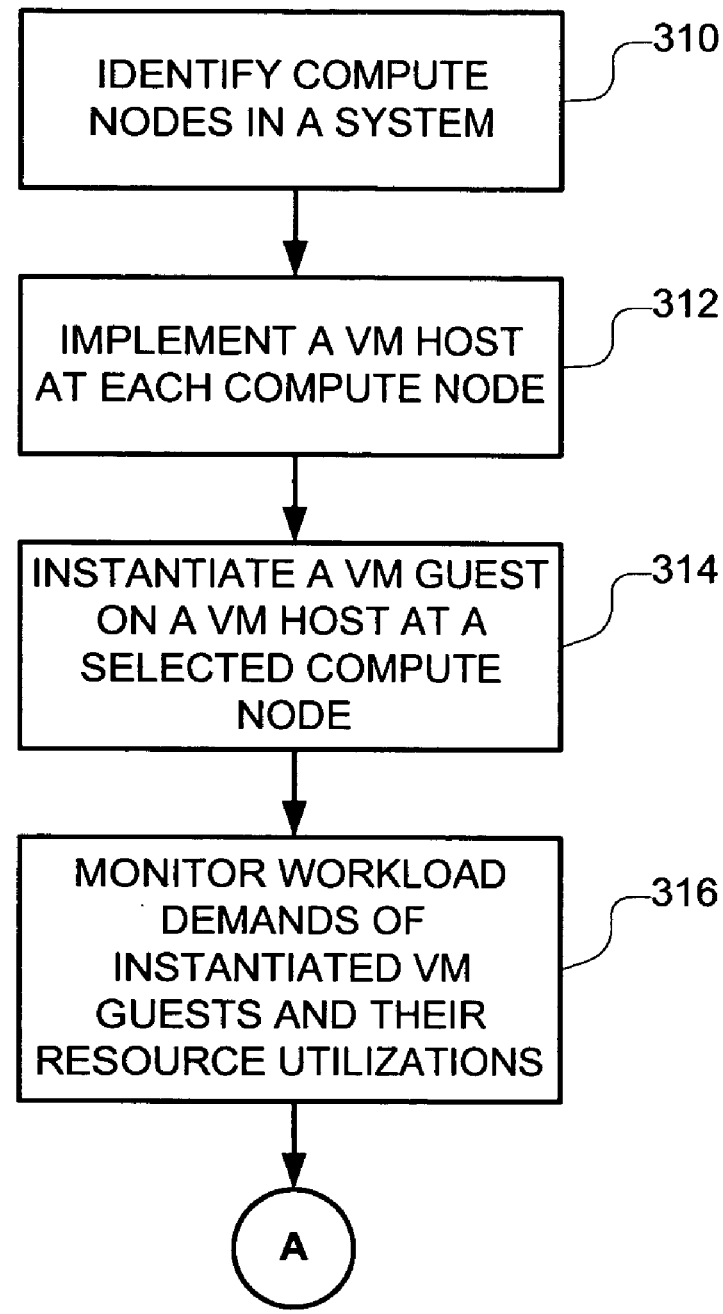
FIGS. 3A-B illustrate a method for regulation the power consumption of a IT system, in accordance with one embodiment.
Figure 3B:
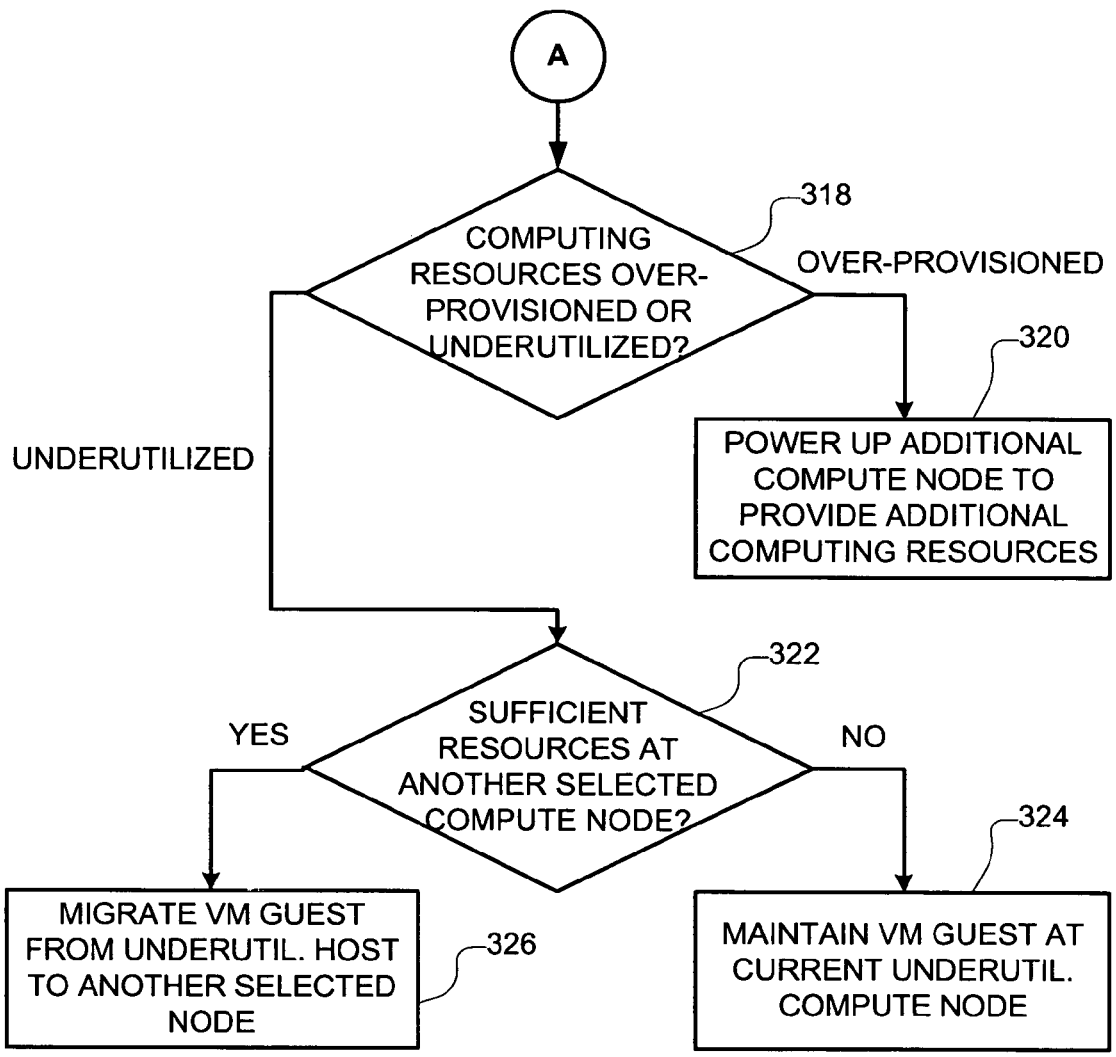

FIGS. 3A-B illustrate a method 300 for regulating the power consumption of an IT infrastructure or system, such as a data center or an IT network enterprise. For illustrative purposes only and not to be limiting thereof, the method 300 is discussed in the context of the system 100 illustrated in FIG. 1.

At 310, multiple compute nodes, such as nodes 110a-n, are identified in the system 100 to identify a pool of computing resources to be regulated for dynamic power consumption. The nodes 100a-n may be situated at the same geographical location or geographically dispersed (i.e., situated at different geographical locations). This may be done by the CMI module 190 using any suitable proprietary or commercially-available system analysis or network management software. This identification includes an identification of the computing resources and their workload capacity at each of the compute nodes 100a-n.

At 312, at least one VM host 120 is implemented at each of the identified compute nodes 100a-n. This implementation may be performed by a user, such as a system administrator, loading up proprietary or commercially-available software into the compute nodes 100a-n to deploy the VM hosts 120. As noted earlier, the VM hosts running on separate compute nodes are version compatible to be operable to migrate VM guests to and from one another.

At 314, one or more VM guests are instantiated on each of the VM hosts 120 deployed at each of the compute nodes 110a-n, or a subset thereof, to handle workloads given to the system 100. As noted earlier, a user such as a system administrator may determine the desired number of VM guests to instantiate on one or more of the VM hosts at the compute nodes 110a-n (through software programming of the VM hosts), based on the available computing resources and their workload capacity at each of the compute nodes 110a-n and the amount of workloads given to the system 100. Thus, the user may determine or select whether all or some of the compute nodes 110a-n are to be used to instantiate the desired number of VM guests. For example, two VM guests 140a-b are instantiated on a VM host 120 at the compute node 110a and two other VM guests 140c-d are instantiated on a VM host 120 at the compute node 110n.

At 316, the CMI module 190 constantly monitors the workload demands of the one or more instantiated VM guests operating in the selected VM hosts and the corresponding resource utilization in the underlying compute nodes by such VM guests. Such resource utilization is obtained from native measurements of the performance metrics by a self-diagnostic unit 226 in each compute node as described earlier. This monitoring may be performed on a predetermined periodic basis, for example, every 30 seconds. Thus, to follow the aforementioned example, the CM module 190 constantly monitors the two VM guests 140a-b hosted at the compute node 110a (and corresponding resource utilization at such a node) and the two VM guests 140c-d hosted at the compute node 110n (and corresponding resource utilization at such a node).

At 318, the CMI module 190 determines whether the monitored workload demands have increased at any of the selected compute nodes, such as the compute nodes 110a and 110n in the running example, such that the computing resources in the underlying physical hardware 130 become over-provisioned (based on the constantly-measured performance metrics at the selected compute node), or the monitored workload demands have decreased such that the computing resources in the underlying physical hardware 130 at any of the selected compute node become underutilized (also based on the constantly-measured performance metrics at the compute node).

At 320, if the CMI module 190 determines that the capacity of the underlying physical hardware 130 at a compute node, such as the compute node 110a in the running example, is over-provisioned from an increase in the workload demands of the VM guests, such as the VM guests 140a-b, being hosted at such a node (based on the constantly-measured performance metrics), the CMI module 190 may then apply its predetermined rules to power up one or more additional compute nodes for the system 100 to accommodate the increased workload demands. The additional compute node may be a new compute node that is inserted and powered up in the system 100, such as a new compute node 110(n+1). An additional compute node also may be an existing powered-down compute node that was previously identified to be in the system 100 and is now powered up in order to take on the increased workload demands, such as a compute node 110b. To continue with the running example, there may be an increase in the workload demand of the existing VM guest 140b hosted at the compute node 110a, or an additional VM guest 140f is hosted by the compute node 110a. Thus, a new compute node 110(n+1) or an existing compute node 110b may be powered up to migrate one of the existing VM guests 140a-b or the additional VM guest 140f to a VM host 120 in the powered-up compute node 110(n+1) or 110b.

At 322, however, if the CMI module 190 determines that the capacity of computing resources in the underlying physical hardware 130 at a compute node is underutilized, it may then apply its predetermined rules to further determine whether there are sufficient computing resources at any of the other selected compute nodes to accommodate the workload demands of the VM guest(s) currently residing or operating at the underutilized compute node. In the running example, if the compute node 110a is underutilized by the VM guests 140a-b being hosted at such a node, the CMI module 190 then determines whether the compute node 110n has sufficient workload capacity to host the VM guests 140a-b in addition to its own VM guests 140c-d. Of course, if only one compute node was selected to host VM guests at the beginning, and such a node is being underutilized, such a node remains active in service.

At 324, if the CMI module 190 determines that there are not sufficient computing resources at the other selected compute nodes to accommodate those VM guests currently residing at the underutilized compute node, such VM guests remain where they are.

At 326, however, if the CMI module 190 determines that there are sufficient resources at one or more other nodes to accommodate those VM guests currently residing at the underutilized compute node, it then offload or migrate such VM guests to the one or more other nodes and power off the underutilized compute node (via the utilization agent 226 therein) to reduce power consumption in the system 100. For example, the VM guests 140a-b are then migrated to the VM host 120 in the compute node 110n. In one embodiment, one or more additional rules or criteria may be considered for the migration of VM guests. One of the rules may be based on the effect of a power-up latency in a compute node to the migration of a VM Guest. For example, the power-up latency of the underutilized compute node 110a may be too long to accommodate any subsequent re-migration of VM guests to such a node because the time delay may hinder operations of the VM guests. Thus, a compute node may remain in service to host its existing VM guests despite a determination that the compute node is underutilized.

In one embodiment, the above-described method 300 is also applicable for migrating VM guests between VM hosts in a single compute node in instances where the VM hosts support real-time add and delete of individual computing resources, such as CPUs, memories, I/O controllers, core logic chipsets, etc., whereby each of these computing resources are operable to switch between different power modes independent of other computing resources.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system for dynamically regulating power consumption in an information technology (IT) infrastructure having a plurality of compute nodes interconnected over a network, the system comprising:

at least one virtual machine (VM) host deployed at each of the plurality of compute nodes, the at least one VM host is operable to host at least one VM guest, and the VM hosts on different ones of the plurality of compute nodes are version compatible to enable migration of the VM guests among the VM hosts; and a management module connected to the plurality of compute nodes over the network to receive a native measurement of a performance metric of a computing resource in each of the plurality of compute nodes, the management module is operable to dynamically regulate power consumption of the plurality of compute nodes by migrating the VM guests among the VM hosts based at least on the received performance metrics of the plurality of compute nodes, wherein the management module is operable to determine whether there is sufficient capacity at another compute node of the plurality of compute nodes to accommodate the at least one VM guest from the one compute node and upon the determining that there is sufficient capacity at the another compute node, migrating the at least one VM guest from the one compute node to the another compute node.

2. The system of claim 1, wherein each of the compute nodes comprises a diagnostic unit operable to measure the performance metric from a performance counter native to the computing resource in the each compute node in order to provide the native measurement of the performance metric of the each compute node.

3. The system of claim 2, wherein each of the computer nodes further comprises a utilization agent operable to monitor the native measurement of the performance metric of the each compute node measured by the diagnostic unit.

4. The system of claim 2, wherein the computing resource in the each compute node includes the diagnostic unit therein.

5. The system of claim 2, wherein the management module includes the utilization agent therein.

6. The system of claim 3, wherein the diagnostic unit and the utilization agent are incorporated into a single module.

7. The system of claim 1, wherein at least one of the plurality of compute nodes is a physical computing platform with a different hardware configuration from that of a physical computing platform of another one of the plurality of compute nodes.

8. The system of claim 1, wherein the IT infrastructure comprises a blade server system and at least some of the plurality of compute nodes are server blades in the blade server system.

9. The system of claim 1, wherein each of the plurality of compute nodes is operable to switch among multiple power modes independent of other ones of the plurality of compute nodes.

10. The system of claim 1, wherein the management module is operable to switch one of the plurality of compute nodes to a power down state to conserve power upon a migration of all the VM guests from the one compute node to the another compute node of the plurality of compute nodes.

11. The system of claim 1, wherein the management module is external to the IT infrastructure of which power consumption it dynamically manages.

12. A method for dynamically regulating power consumption in a system, the method comprising:
    identifying a plurality of compute nodes in the system;
    implementing at least one virtual machine (VM) host at each of the plurality of compute nodes;
    instantiating at least one VM guest on the at least one VM host at each of the plurality of compute nodes;
    monitoring a workload demand of the at least one VM guest at each of the plurality of compute nodes and natively-measured performance metrics at the each compute node; and
    determining whether the workload demand of the at least one VM guest at one of the plurality of compute nodes exceeds or underutilizes a capacity of the one compute node; and
    upon the determining that the workload demand of the at least one VM guest underutilizes the capacity of the one compute node,
        a) providing migration of the at least one VM guest to another one of the identified plurality of nodes in the system; and
        b) powering down the one underutilized compute node to conserve power consumption once the migration is provided,
    wherein providing migration of the at least one VM guest comprises:
        determining whether there is sufficient capacity at the another one compute node to accommodate the at least one VM guest from the one compute node; and
        upon the determining that there is sufficient capacity at the another one compute node, migrating the at least one VM guest from the one compute node to the another one compute node.

13. The method of claim 12, wherein the additional compute node is another one of the identified plurality of compute nodes in the system.

14. The method of claim 12, wherein the additional compute node is a new compute node additional to the identified plurality of nodes in the system.

15. The method of claim 12, wherein upon the determining that the workload demand of the at least one VM guest exceeds the capacity of the one compute node, powering up an additional compute node to provide additional capacity to accommodate the workload demand of the at least one VM guest.

16. The method of claim 1, wherein providing migration of the at least one VM guest further comprises:
    upon the determining that there is not sufficient capacity at the another one compute node, maintaining the at least one VM guest at the one compute node.

17. The method of claim 12, wherein powering down the one underutilized compute node comprises one of:
    shutting down a power of the one underutilized compute node; and
    placing the underutilized compute node in a standby power mode.

18. The method of claim 12, wherein migrating the at least one VM guest from the one compute node to the another one compute node comprises:
    migrating the at least one VM guest from the one compute node to the another one compute node based on at least a latency of the one compute node to power back up once in a power-down mode.

19. A computer readable medium on which is encoded program code for dynamically regulating power consumption in a system having a plurality of compute nodes, the encoded program code comprising:
    computer program code executed to implement at least one virtual machine (VM) host at each of the plurality of compute nodes;
    computer program code executed to instantiate at least one VM guest on the at least one VM host at each of the plurality of compute nodes;
    computer program code executed to monitor a workload demand of the at least one VM guest at each of the plurality of compute nodes and natively-measured performance metrics at the each compute node; and
    computer program code executed to determine whether the workload demand of the at least one VM guest at one of the plurality of compute nodes exceeds or underutilizes a capacity of the one compute node; and
    computer program code executed to, upon the determining that the workload demand of the at least one VM guest underutilizes the capacity of the one compute node,
        a) provide migration of the at least one VM guest to another one of the identified plurality of nodes in the system; and
        b) power down the one underutilized compute node to conserve power consumption once the migration is provided,
    the computer program code executed to provide migration of the at least one VM guest comprises:
        computer program code executed to determine whether there is sufficient capacity at the another one compute node to accommodate the at least one VM guest from the one compute node; and
        computer program code executed to, upon the determining that there is sufficient capacity at the another one compute node, migrate the at least one VM guest from the one compute node to the another one compute node.

* * * * *